United States Patent
Willsie

(10) Patent No.: US 8,009,904 B2
(45) Date of Patent: Aug. 30, 2011

(54) MEDICAL DIAGNOSTIC ULTRASOUND GRAY SCALE MAPPING FOR DYNAMIC RANGE ON A DISPLAY

(75) Inventor: Todd D. Willsie, Seattle, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1069 days.

(21) Appl. No.: 11/827,799

(22) Filed: Jul. 13, 2007

(65) Prior Publication Data
US 2009/0018447 A1    Jan. 15, 2009

(51) Int. Cl.
*G06K 9/00* (2006.01)
*G09G 5/02* (2006.01)

(52) U.S. Cl. ......................... 382/167; 345/600

(58) Field of Classification Search .................. 382/162, 382/167; 345/600
See application file for complete search history.

(56) References Cited

U.S. PATENT DOCUMENTS

| | | | |
|---|---|---|---|
| 4,857,901 A * | 8/1989 | Lathrop ......................... | 345/601 |
| 5,285,786 A * | 2/1994 | Fujii ............................. | 600/425 |
| 5,552,800 A | 9/1996 | Uchikoga et al. | |
| 5,573,001 A | 11/1996 | Petrofsky et al. | |
| 6,135,961 A * | 10/2000 | Pflugrath et al. .............. | 600/447 |
| 6,359,626 B1 * | 3/2002 | Akeley .......................... | 345/596 |
| 7,580,044 B2 * | 8/2009 | Tung et al. .................... | 345/596 |
| 7,643,040 B1 * | 1/2010 | Gabrielson et al. ........... | 345/690 |
| 2004/0002652 A1 | 1/2004 | Phelps et al. | |
| 2005/0154303 A1 * | 7/2005 | Walker et al. ................. | 600/443 |
| 2008/0108899 A1 * | 5/2008 | Halmann et al. .............. | 600/459 |
| 2008/0208061 A1 * | 8/2008 | Halmann ....................... | 600/459 |

FOREIGN PATENT DOCUMENTS

JP    2002199241 A  *  7/2002

* cited by examiner

*Primary Examiner* — Yubin Hung

(57) ABSTRACT

Gray scale information is mapped to a display with increased dynamic range. Rather than mapping ultrasound data to equal color components, the mapping is offset. The offset may provide a deviation from gray, but the deviation of such a small increment may not be perceptible. Instead, the deviation provides different brightness, which is more easily perceived. The deviation allows for additional levels of gray, such as the 64 levels on a 6-bit display plus any deviation values (e.g., 128 levels for 64 equal color components and 64 with one of the color components offset by one increment). Higher dynamic range ultrasound data maps with less or no loss of dynamic range to a display with a lower true gray scale dynamic range. Spatial dithering may alternatively or additionally increase perception of the dynamic range.

1 Claim, 1 Drawing Sheet

MEDICAL DIAGNOSTIC ULTRASOUND GRAY SCALE MAPPING FOR DYNAMIC RANGE ON A DISPLAY

BACKGROUND

The present embodiments relate to medical diagnostic ultrasound imaging. In particular, gray scale mapping is provided for ultrasound imaging.

Displays have a dynamic range. For example, a color liquid crystal display provides for 6 bit red, 6 bit green, and 6 bit blue ranges. For displaying gray scale (monochrome) information, the red, green and blue (RGB) values are set equal, providing a dynamic range of 64 increments or gray levels. However, the ultrasound information may have greater dynamic range, such as 8 bit B-mode or tissue values. The ultrasound image contains more grayscale information than can be shown on the screen. The extra information is discarded for display. However, loss of dynamic range is not generally desired.

Tint maps or photopic imaging may increase the dynamic range. The highest and/or lowest values are mapped to different tints, such as blue. The display associated with these values have noticeable or visible coloration at one end of the scale, so may not be desirable.

BRIEF SUMMARY

By way of introduction, the preferred embodiments described below include methods, systems, instructions, and logic encoded media for mapping gray scale information to a display. Rather than mapping ultrasound data to equal color components, the color values are offset. For example, one or two of three color components are offset by one, two, or three increments. The offset may provide a deviation from gray, but the deviation of such a small increment may not be perceptible in typical imaging settings, such as an examination room. Instead, the deviation provides different brightness, which is more easily perceived. The deviation allows for additional levels of gray, such as the 64 levels on a 6-bit display plus any deviation values (e.g., 128 levels for 64 equal color components and 64 with one of the color components offset by one increment). Higher dynamic range ultrasound data may be mapped with less or no loss of dynamic range of grayscale levels to a display with a lower true gray scale dynamic range. Spatial dithering may alternatively or additionally be used to increase perception of the dynamic range.

In a first aspect, a method is provided for mapping gray scale information to a display. An ultrasound value of N bits is mapped to color values for three color parameters of a display such that the color values for the three color parameters are not all equal, but are perceived as gray by a user. Display values are output for the three color parameters of the display. The display values are a function of the color values, where each display value has M bits or less and where M is less than N.

In a second aspect, a system is provided for mapping gray scale information to a display. A display has less than 10 inches along a longest dimension. The display has color components each with a range of incremental values for each pixel. A B-mode detector is operable to output B-mode ultrasound data. A processor is operable to output color data for each pixel of the display as a function of the B-mode ultrasound data. The color data for each pixel corresponds to the color components of the display, and the color data of each of the color components for a given pixel is at most three incremental values different than the color data of the other color components.

In a third aspect, a logic encoded storage medium has stored therein data representing executable instructions for mapping gray scale information to a display. The storage medium includes instructions for mapping ultrasound data to RGB data, and varying the RGB data such that greater than X levels of brightness are provided for substantially gray scale output by a M bit liquid crystal display where X is equal to $2^M$.

In a fourth aspect, a method is provided for mapping gray scale information to a display. Ultrasound values of N bits correspond to a frame of data for one image. The ultrasound values are mapped to color values for three color parameters of a display. The color values are spatially dithered. A substantially gray scale image is generated on the display as a function of the dithered color values.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

An increased intensity dynamic range is provided for ultrasound images. Spatial dithering and/or color map selection increases the apparent display dynamic range. For example, a combination of hardware-based dithering and RGB look-up table (LUT) programming algorithms is used to maximize the brightness dynamic range. An increase in dynamic range for grayscale images may be provided.

Some displays, such as small liquid crystal displays (LCD) for portable or handheld devices, may have a more limited dynamic range than the data to be displayed. For example, low cost LCD displays have 6 bit rig/b digital inputs (e.g., 64 true gray increments). However, ultrasound data may have greater dynamic range. For example, with 8 bit ultrasound data, the 2 least significant bits of the R, G, B values or ultrasound values are dropped to generate the 6 bit LCD panel colors. The LCD panel grayscale level may only change when the tissue intensity (ultrasound value) changes by 4 levels.

To avoid loosing information, the dynamic range of the display for grayscale is increased. This increase is possible due to the generally low spatial frequency content of tissue ultrasound images. The RGB values for the LCD are changed sequentially such that an increased brightness is perceived by the user. Because the difference between the values is no more that one code or increment (e.g., R=150, G=151, B=151), the change in color from pure monochrome is less noticeable than the increased brightness.

Dithering may also take advantage of the low spatial frequency of the ultrasound image. Since the tissue intensity typically does not change quickly, the brightness of a small area of the image is defined by the average brightness of several pixels due to user perception. This allows spatial dithering of RGB values to provide twice the number of brightness levels available without dithering.

Figure 1:
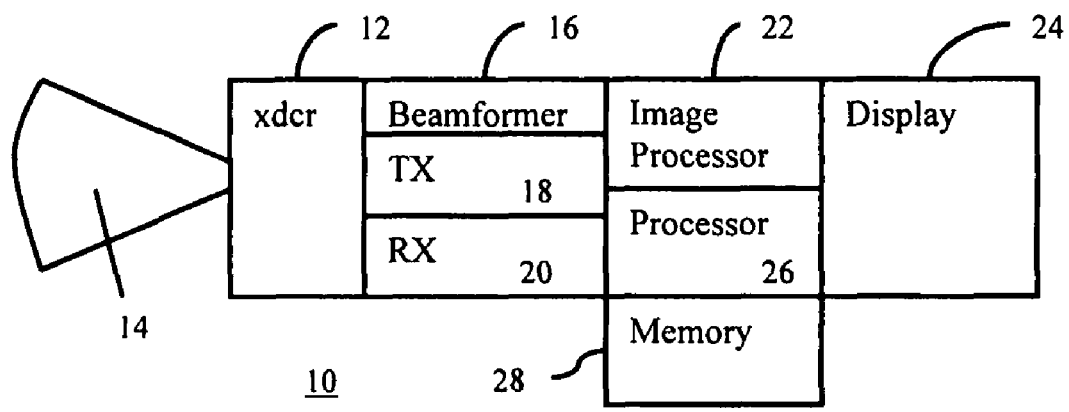
FIG. 1 is a block diagram of one embodiment of an ultrasound imaging system for mapping gray scale information to a display.

FIG. 1 shows one embodiment of a medical diagnostic ultrasound imaging system 10 for mapping gray scale information to a display 24 in an ultrasound imager. Any ultrasound imaging system 10 may be used. In one embodiment, the system 10 is a cart based imaging system. In another embodiment, the system 10 is a portable system, such as a briefcase-sized system or laptop computer based system. Other embodiments include handheld ultrasound systems. For example, one or more housings are provided where the entire system is small and light enough to be carried in one or both hands and/or worn by a user. Any weight may be provided, such as 1-15 pounds (e.g., 6 pounds or less). In one embodiment, the system weighs less than 2 pounds to minimize strain in carrying the system by a medical professional. A battery powers the system, and small-scale circuits, such as integrated circuits, implement the electronics. In another example, a transducer is in one housing to be held by a person, and the imaging components and display are in another housing or housings to be held by a person. Coaxial cables connect the transducer housing to the imaging component housing. A single housing for an entire handheld system may be provided.

The system 10 includes a transducer 12, a beamformer 16, an image processor 22, a display 24, a processor 26, and a memory 28. Additional, different, or fewer components may be used. For example, a cable connects the transducer 12 to the beamformer 16, and/or a cable connects part of the display 24 (e.g., monitor or LCD) to another part of the display 24 (e.g., video card) or the image processor 22. The image processor 22 and/or processor 26 may be combined as one processor or group of processors, or maintained separate as shown.

The elements connect directly to the beamformer 16. Alternatively, multiplexers provide for aperture control to connect elements to different channels at different times. To reduce a number of cables, the number of connections from the elements to the beamformer 16 may be reduced. Time multiplexing, frequency multiplexing, sub-array mixing, partial beamforming or other processes for combining signals may be used. For example, signals from groups of four or other numbers of elements are combined onto common data paths by sub-array mixing, such as disclosed in U.S. Pat. No. 5,573,001 or U.S. Published Application No. 20040002652, the disclosures of which are incorporated herein by reference.

The transducer 12 is an array of elements. Any array may be used, such as a linear, phased, curved linear, or other now known or later developed array. Any number of elements may be used, such as 64, 96, 128, or other numbers. One, two, or other multi-dimensional (e.g., 1.25, 1.5, or 1.75) arrays may be provided. The elements are piezoelectric or capacitive membrane elements.

In response to signals from the beamformer 16, the transducer 12 generates acoustic beams. The acoustic beams are focused to different locations to scan a two or three-dimensional region 14. The scan format is linear, sector, Vector®, or other now known or later developed scan format. The scan format includes a set or programmable number of beams within the region 14, such as 50-150 beams. The depth of the region 14 may be set or programmable.

The transmit portion 18 of the beamformer connects with electrodes on one side of the elements, and the receive portion 20 of the beamformer 16 connects with electrodes on an opposite side of the elements. Passive or active switching grounds the electrodes not being used, such as grounding transmit side electrodes during receive operation. Alternatively, the beamformer 16 connects to the transducer 12 through a transmit/receive switch.

The transmit and receive portions 18, 20 are formed in a same device or are separate. The transmit portion 18 is a transmit beamformer. The receive portion 20 is a receive beamformer.

The beamformer 16 is a digital beamformer. For digital beamforming, analog-to-digital converters sample the signals from the elements and output element data to the beamformer 16. The beamformer 16 is an application specific integrated circuit, processor, field programmable gate array, digital components, integrated components, discrete devices, or combinations thereof.

The image processor 22 is a processor, detector, filter, scan converter, or combinations thereof. In one embodiment, the image processor 22 includes a B-mode detector. The B-mode detector determines an intensity of the echo signals. The envelope or other characteristic of the receive beamformed data responsive to tissue is detected. The detection is performed for an entire scan or a frame of data for one image.

Scan conversion spatially converts from a scan format to a display format, such as from a polar coordinate format to a Cartesian coordinate format. Any now known or later developed image processor 22 and/or image processing may be used, such as an FPGA or application specific integrated circuit.

The display 24 is a liquid crystal display, monitor, plasma screen, projector, printer, combinations thereof, or other now known or later developed display device. The display 24 includes pixel locations arranged in a grid. Each pixel location includes red, blue, and green light sources. Each color light source is a color component of the display. By using different intensities or brightness for each color component, a color and brightness is output from the pixel. The user visually integrates the components into a perceived color and brightness for each pixel. Any range of incremental levels may be used for each color component, such as 6-bit, 8-bit, 12-bit or others. The range for each color component is the same or different. Displays with different color components, distribution of color sources other than per pixel, or other display formats or pixel distributions may be used.

In one embodiment, the display 24 is a small LCD, such as associated with handheld devices (e.g., cellular phones or personal data assistants). For example, the display 24 is less than 10 inches along a longest dimension, such as being about 3×4 inches. Any number of pixels may be provided. In alternative embodiments, the display 24 is larger, such as associated with personal computers, lap-top computers, or television displays.

The display 24 operates to generate an image from data provided by the image processor 22. The display 24 receives scan converted ultrasound data and displays an image. An image is generated for each frame of data. For real-time ultrasound imaging, the display 24 receives frames of data and displays a sequence of ultrasound images each representing the region 14 or overlapping portions thereof. The data is provided to the display 24 by pixel. Values for the color components (e.g., RGB or YUV) are output to the display. The values are analog or digital values. These color component values are selected or mapped from the ultrasound data. The processor 26 maps or otherwise formats the ultrasound data into display values.

The processor 26 is a general processor, control processor, digital signal processor, application specific integrated circuit, field programmable gate array, digital circuit, memory, combinations thereof, or other now known or later developed control processor. For example, the processor 26 is a look-up table (memory) and corresponding logic device for converting ultrasound data into color values and a field programmable gate array or other hardware operable to dither spatially the color values. The processor 26 is separate from or the same as the image processor 22. In one embodiment, the processor 26 is a single device. In other embodiments, the processor 26 includes a plurality of devices, such as distributed processors. The processor 26 may be part of a display processor or a separate component.

The processor 26 is operable to output color data for each pixel of the display 24 as a function of B-mode or tissue ultrasound data. Other types of ultrasound data may be used, such as displaying flow or Doppler information in grayscale. The processor 26 determines color component data from input ultrasound data, such as using a look-up table, relational information, or conversion formula. The color component data is processed, such as dithering and/or removing bits, for output to the display 24. The final data output to the display 24 is a function of the color component data, but with fewer bits. Alternatively, the color component data is output to the display 24 without further change.

In one embodiment, the processor 26 maps N bits of the B-mode ultrasound data to color component data for three color components. Two or other numbers of color components may be provided. Each component of the color component data is also N bits. Alternatively, the color component data has a higher or lower dynamic range than the input ultrasound data. The color component data are RGB data, but other formats may be used (e.g., YUV).

For each pixel, the mapping provides increased dynamic range for grayscale imaging. The increased dynamic range is provided by offsetting color component data from true gray. For example, the red, green, and blue values are made non-equal (e.g., R=G≠B or R≠G≠B), but are within one, two, or three increments of each other or monochrome. By minimizing the extent of offset to three or fewer levels, the user may not perceive color other than gray but perceive change in brightness. For example, three color components are used, providing eight different grayscale levels with only an offset of 1 where a single true gray scale value (R=G=B) would be provided. By providing 64 or other number M of gray scale values, M×8 levels or increments may be provided.

Fewer than eight different grayscale levels for each true gray level may be used. For example, 8-bit ultrasound values are input for use with a 6-bit LCD display 24. Rather than 64 true gray increments, 256 gray increments are desired to provide the same dynamic range as input. The possible combinations providing the most uniform increases in brightness and/or minimizing non-gray perception are used to provide 256 gray scale levels. More than 64, but less than 256, or more than 256 levels may be provided.

The mapping provides the desired dynamic range in grayscale, but with display data output at the dynamic range of the display 24. Alternatively, the mapping provides data to be truncated for use by the display 24. The mapping accounts for the truncation with an offset. For example, a LUT is generated to map 8 bit tissue intensity to a 24 bit color (e.g., 8 bits for each color component). The RGB color values are linear but with green and blue values starting with an offset of 1 and 2. The red sequence is 0, 1, 2, 3, 4, 5, 6, . . . 253, 254, 255, the green sequence is 1, 2, 3, 4, 5, 6, 7, . . . 254, 255, 255, and the blue sequence is 2, 3, 4, 5, 6, 7, 8, . . . 255, 255, 255. In this example, an ultrasound value of 6 is coded in binary as red 000110, green 000111, and blue 001000. Upon removal of the two least significant bits, the values for the actual display are red 0001, green 0001, and blue 0010. Some values in this example map to true gray, but others map to a substantially gray value with a difference in level or increment for any one color component less than one from one or both of the other color components.

As another example, the LUT or processor implements the mapping as:
for i=0 to 255

$r(i)=\min(i,255);$ $g(i)=\min(i+2,255);$ $b(i)=\min(i+3,255);$

The "min(x,y)" function limits x to y or less.

The R, G and B values may be shifted relative to each other in any order. The offsets may be applied to any of the color components, such as offsetting red by one or two. Since blue deviation is least noticeable to users, the blue is offset by two or three in one embodiment. Green deviation may be less noticeable to the user than red, so green is offset by one in one embodiment.

Other mapping may be used with or without a look-up table. Any mapping using deviation from true gray for additional brightness levels may be used. The deviation is provided along the entire, most, or other portion of the mapping range to minimize the needed amount of deviation from true gray while providing the desired output dynamic range.

The mapping may be linear or non-linear. The LUT provided above with the green offset of 1 and blue offset of 2 is a linear example. For a non-linear example, values in a range associated with tissue are mapped closer together to provide a more similar grayscale level or levels for tissue signals. The ultrasound data may be mapped or shifted prior to color mapping. Alternatively, the color values mapped from the ultrasound data are again mapped non-linearly. In another alternative, any non-linear mapping and the color mapping are incorporated into a same table. The B-mode ultrasound data is non-linearly mapped to the color data. For example, an arbitrary intensity mapping LUT is used to map 8 bit tissue intensity values to 8 bit display brightness values.

As an alternative or additional technique to increase the dynamic range, the processor 26 applies spatial dithering to the color values and/or ultrasound data. For example, a 2 by 2 dither matrix is used to add the value 1 to the R, G, B LUT values with the following pattern:
  0, 1, 0, 1, 0, . . . (Display line N)
  1, 0, 1, 0, 1, . . . (Display line N+1)
  0, 1, 0, 1, 0, . . . (Display line N+2).
Every other pixel, offset as a function of line, is increased or decreased by a value of one. The data of all three components, only one, or only two components is dithered. For combination with the color offset for increasing dynamic range, all of the color component values are increased or decreased by a same amount to avoid further color deviation. The sum is clipped or saturated to a maximum value of 255 or other values associated with the dynamic range.

This pattern is the same or may be inverted on every other video frame. Other patterns may be used, such as dithering every third or fourth pixel. Combinations of different spatial dithering patterns may be used. Spatial dithering takes advantage of visual integration. By outputting a different but similar brightness, the user perceives a brightness level that is a combination of both. The difference is provided spatially or temporally with dithering. By inverting between frames, but spatial and temporal dithering may be provided. Since the ultrasound data has a relatively lower spatial frequency that the display 24, dithering may not result in loss of or alteration of diagnostically useful information. In alternative embodiments, temporal dithering is provided, such as adding values into every other image in a sequence.

After dithering or mapping, an output to the display 24 is generated by the processor 26. The least significant bits of the color component data are removed. For example, the 6 most significant bits of the 8 bit color mapped data with or without further dithering are output. Data format or with a dynamic range appropriate for the display 24 is output. The display data is a function of the B-mode ultrasound data, and may include a dynamic range greater than a monochrome dynamic range of the display 24 for grayscale imaging. The pixel output of the display 24 is substantially gray. Deviation by three or fewer increments provides substantially gray values. Alternatively, the mapping provides output at the bit range of the display 24.

The mapping and/or dithering is performed for each pixel or pixels to be used for an image. Based on the mapping, some or all of the color values deviate from true gray. For example, RGB data for some but not all of the spatial locations for an image are incremented away from true monochrome. The data output for the pixels includes both incremented and non-incremented RGB data. Similarly, the spatial dithering provides for altering some, but not all, of the color values.

The memory 28 is a logic encoded medium having stored therein data representing executable instructions for mapping gray scale information to a display. For example, software is stored and executable by a processor. The instructions for implementing the processes, methods and/or techniques discussed herein are provided on computer-readable storage media or memories, such as a cache, buffer, RAM, removable media, hard drive or other computer readable storage media. Logic encoded storage media include various types of volatile and nonvolatile storage media. The functions, acts or tasks illustrated in the figures or described herein are executed in response to one or more sets of instructions stored in or on logic encoded storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. In another embodiment, the memory 28 is within a handheld ultrasound system with one or more housings. The handheld ultrasound system includes the beamformer 16 and the display 24.

Figure 2:
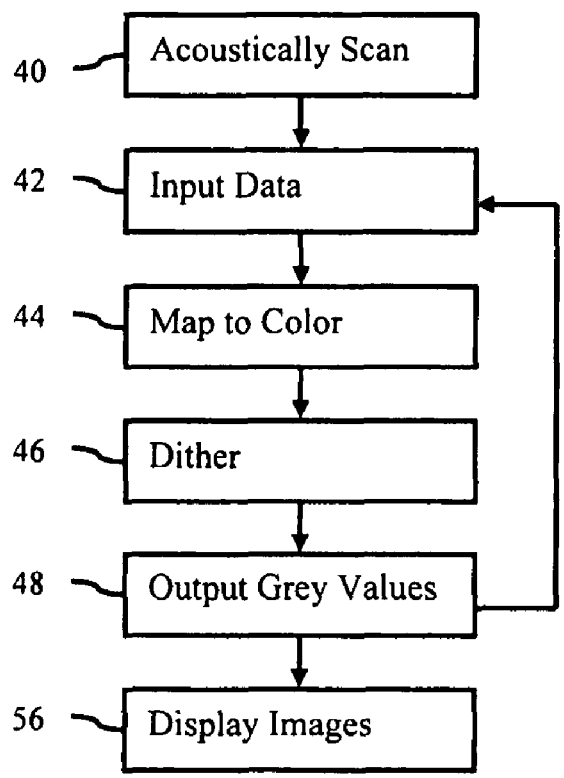
FIG. 2 is a flow chart diagram of one embodiment of a method for mapping gray scale information to a display in ultrasound imaging.

FIG. 2 shows a method for mapping gray scale information to a display in ultrasound imaging. The method is implemented by the system 10 of FIG. 1, a handheld system with one or more housings, or a different system. In one embodiment, the method is implemented as a look-up table in a handheld ultrasound imaging system with a transducer and a display, where the system weighs less than 6 pounds, such as 1-2 pounds. The method is performed in the order shown or a different order. Additional, different, or fewer acts may be performed. For example, act 46 is provided without act 44, or vice versa.

In act 40, a region is scanned with ultrasound. To scan, values of control parameters are loaded or calculated. The control parameters indicate the depth, scan format, number of beams, sample frequency, pulse repetition frequency, focal regions, combinations thereof, or other programmable beamforming characteristic. One or more characteristics may be fixed or not programmable.

After loading values for the control parameters, one or more transmit events are performed. The transmit event includes the generation of electrical signals. The electrical signals are converted by a transducer into acoustic energy. Based on the control parameters, the acoustic energy forms one or more beams. A plane wave or diverging wave may be formed in other embodiments.

In response to the transmit beam or beams of act 44, echoes impinge on the transducer. In the receive event, the echoes are converted to electrical signals by the elements. The electrical signals are beamformed. Relative delays and/or apodization are applied and the data summed. Data representing one or more receive beams is formed from the same electrical signals.

To scan an entire region, the transmit and receive events may be repeated. Alternatively, a plane wave is transmitted and all or groups of receive beams are formed in response to each transmission. The scanning of act 40 is performed pursuant to a schedule of events. The schedule includes the loading, transmitting and receiving to scan a region. The region is an entire two or three-dimensional region for generating an image. Alternatively, the scheduling is performed for sub-regions less than the entire region to be scanned. The schedule may be repeated for a sequence of scans, such as until the user indicates different scanning to be performed (e.g., a different depth).

In act 42, ultrasound data is input for mapping and/or dithering. The data is input directly or indirectly from a B-mode or other detector. The data may be input from a memory or video recording. The input may be via an actual or physical input or port, or may be a conceptual input of data progressing along an image processing path or in a process. The data may be filtered and/or scan converted prior to input for mapping.

The ultrasound data includes a single value for each spatial location. For example, a frame of ultrasound data includes values for each pixel or other spatial location. Each value has a same number of bits or dynamic range, such as N bits where N is any value. One example is 8 bit values for the ultrasound data.

In act 44, the ultrasound data is mapped to color values. The color values are for color components, such as RGB or YUV. For gray scale imaging, the color values are equal or substantially equal. To increase dynamic range, at least some ultrasound data values map to color values that are not all equal, but are perceived as gray by a user. For example, the ultrasound data is mapped RGB values, but at least the R, G, or B values are offset from the others or one of the others. The offset is two or fewer increments, but may be more, such as three or fewer. In one embodiment, each of the color values is within one increment of one or both of the other values. Other values of the ultrasound data may map to monochrome values. Alternatively, all values map to offset color values.

In one embodiment, a table of color values in relation to input ultrasound values is provided. The input ultrasound values and the color values have a same or different number of bits (dynamic range), but are more than the dynamic range of the display. In the table for one or more input values, at least one of the color components includes an offset such that an output color value is offset the others or from equality. The ultrasound value is mapped to different color values for one of the three color parameters than another one of the three color parameters as a function of the at least one offset.

The perception of gray by a user is based on a median or mean number of people in typical imaging situation, such as in a well lighted room for handheld devices, not positively perceiving a non-grayscale color. As another example, the perception of gray is provided by maintaining the deviation between the color values for a pixel to three or less. Due to the spatial frequency of ultrasound images, speckle, and/or noise of ultrasound images, the deviation from true gray is less likely perceived by the user. The rapid frame rate, such as 20 Hz, may also make deviation in particular pixels unnoticeable to a typical user scanning an entire image.

The variation of the RGB data from monochrome provides a greater number of increments in the grayscale. For example, a 6-bit LCD provides 64 grayscale levels. Varying the RGB data may allow for 65 or more grayscale levels, providing a greater number of levels of brightness with a substantially gray scale output.

The mapping is linear. The value spacing for input and output is the same. Alternatively, the ultrasound values non-linearly map to the color values. Non-linear mapping may move low or high signals lower or higher respectively, such as moving values likely associated with noise (low level signals) to black. Non-linear mapping may move certain ranges of ultrasound values to a narrower or larger range of values.

In act 46, the ultrasound data or color values are dithered. The dithering is spatial. Prior to reduction to a lower dynamic range, some or all of the values for a region or entire image are modified. For example, one is added to every other value. The values are the color values or the ultrasound data. Due to visual integration from adjacent pixels, dithering may double or otherwise increase the dynamic range. The locations for adjustment may be varied between different frames in a sequence. Non-linear arrangements of locations to be modified may avoid artifacts, but linear arrangements may be used.

Dithering is used for some input value levels and not for other input value levels. Adding or not adding by dithering for different input values provides an increase in dynamic range.

In act 48, display values are output. The display values are formatted for the display device, such as being digital values. The display values include data for the color components of the display, such as three different values for three different light sources associated with each pixel. Other arrangements of values may be used.

The display values are determined from the color values or as a function of the ultrasound data. The display values each have a number of bits operable for use by the display, such as 6 or 8 bits. Where the color values have a greater number of bits, the least significant bits are removed. The number of bits removed corresponds to the difference between the number of bits of the color values and the number of bits usable by the display. Alternatively, the display values are the same as the color values, such as having a same number of bits.

The acts of inputting 42, mapping 44, dithering 46, and/or outputting 48 are repeated. The repetition occurs in series and/or in parallel. Display values are generated for each spatial location of an image. The image may be generated for an entire display area or only a sub-region of the display area. The spatial locations of the image correspond to pixels or other display locations.

In act 56, one or more images are generated with ultrasound information. Beamformed ultrasound data is detected, scan converted, or otherwise formed into ultrasound image data. The ultrasound image data is converted into display values for a display. The display values are output to the display, resulting in generation of an image. For real-time operation, the scanning of act 40 and the displaying of act 56 occur substantially simultaneously. Substantially accounts for data processing delays and pauses to load control parameters. Frames of beamformed data are sequentially and substantially continuously acquired by scanning in act 40. The frames of data after image processing are sequentially and substantially continuously displayed as images in the displaying of act 56. The displaying of the sequence occurs at a constant or variable frame rate.

The images include grayscale regions. For example, a combination of Doppler and B-mode imaging may be provided. Doppler or flow information is modulated by colors, such as red, yellow, orange, and/or blue scales of color (non-monochrome). The B-mode information is provided in grayscale. B-mode information alone may be used for imaging. In other embodiments, M-mode, spectral Doppler, harmonic, contrast agent, or another type of ultrasound detection is performed, and the resulting data is displayed as grayscale data.

To increase the dynamic range, the grayscale includes one or more increments or levels offset from true grayscale or monochrome. The offset provides for perceptible brightness change with minimal or unperceivable color change. Alternatively or additionally, spatial dithering expands the perception of dynamic range.

While the invention has been described above by reference to various embodiments, it should be understood that many changes and modifications can be made without departing from the scope of the invention. For example, the ultrasound data is any number of bits, and the display has any dynamic range (e.g., 12 bit ultrasound data with a 6, 8, or 10 bit LCD). It is therefore intended that the foregoing detailed description be regarded as illustrative rather than limiting, and that it be understood that it is the following claims, including all equivalents, that are intended to define the spirit and scope of this invention.

I claim:

1. A method for mapping gray scale information to a display, the method comprising:
    inputting an ultrasound value of N bits;
    mapping the ultrasound value to color values for three color parameters of a display such that the color values for the three color parameters are not all equal and are perceived as gray by a user;
    outputting display values for the three color parameters of the display, the display values being a function of the color values, each display value having M bits or less, where M is less than N;
    repeating the inputting, mapping, and outputting for each of a plurality of spatial locations for an ultrasound image; and
    spatially dithering the color values across the spatial locations, the dithering of the color values altering the color values for different spatial locations by different amounts in addition to the mapping, where spatially dithering comprises altering the color values for all three color parameters by a same amount for every other one of the spatial locations and not altering for the remaining spatial locations.

* * * * *